United States Patent
Shi et al.

(10) Patent No.: US 11,303,490 B2
(45) Date of Patent: *Apr. 12, 2022

(54) REFERENCE SIGNAL CONFIGURATION METHOD AND APPARATUS

(71) Applicant: HUAWEI TECHNOLOGIES CO., LTD., Guangdong (CN)

(72) Inventors: Hongzhe Shi, Shanghai (CN); Wei Han, Shanghai (CN); Yi Qin, Kista (SE); Jianqin Liu, Beijing (CN); Peng Jiang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 58 days.

This patent is subject to a terminal disclaimer.

(21) Appl. No.: 16/801,496

(22) Filed: Feb. 26, 2020

(65) Prior Publication Data
US 2020/0195479 A1    Jun. 18, 2020

Related U.S. Application Data

(63) Continuation of application No. 16/406,876, filed on May 8, 2019, now Pat. No. 10,608,857, which is a
(Continued)

(30) Foreign Application Priority Data

Nov. 25, 2017   (CN) .......................... 201711198251.5

(51) Int. Cl.
*H04L 12/28*    (2006.01)
*H04L 27/26*    (2006.01)
(Continued)

(52) U.S. Cl.
CPC ........ *H04L 27/2613* (2013.01); *H04L 1/0026* (2013.01); *H04L 1/1614* (2013.01);
(Continued)

(58) Field of Classification Search
CPC . H04L 1/0026; H04L 27/2613; H04L 5/0048; H04W 24/10; H04W 72/0446; H04B 17/24
(Continued)

(56) References Cited

U.S. PATENT DOCUMENTS

2013/0301450 A1   11/2013  Geirhofer et al.
2015/0244444 A1    8/2015  Mazzarese et al.
(Continued)

FOREIGN PATENT DOCUMENTS

CN   102237958 A   11/2011
CN   102595514 A    7/2012
(Continued)

OTHER PUBLICATIONS

3GPP TS 36.213 V14.4.0 (Sep. 2017), 3rd Generation Partnership Project; Technical Specification Group Radio Access Network; Evolved Universal Terrestrial Radio Access (E-UTRA); Physical layer procedures (Release 14), 462 pages.
(Continued)

*Primary Examiner* — John Pezzlo
(74) *Attorney, Agent, or Firm* — Fish & Richardson P.C.

(57) ABSTRACT

This application discloses a reference signal configuration method and apparatus. Before a network device sends reference signals aperiodically, the network device sends configuration information to a terminal device, where the configuration information is used to indicate a timeslot offset of one or more reference signal resource sets. Therefore, the network device can flexibly send reference signals in different timeslots, thereby reducing a quantity of times of reference signal triggering and measurement result reporting, and improving efficiency of a communications system.

16 Claims, 5 Drawing Sheets

Related U.S. Application Data continuation of application No. PCT/CN2018/093932, filed on Jun. 30, 2018.

(51) Int. Cl.

| | |
|---|---|
| H04L 1/00 | (2006.01) |
| H04L 1/16 | (2006.01) |
| H04L 5/00 | (2006.01) |
| H04W 24/10 | (2009.01) |
| H04W 72/04 | (2009.01) |
| H04W 80/08 | (2009.01) |
| H04J 1/16 | (2006.01) |

(52) U.S. Cl.
CPC ............ *H04L 5/005* (2013.01); *H04L 5/0051* (2013.01); *H04L 5/0096* (2013.01); *H04W 24/10* (2013.01); *H04W 72/0446* (2013.01); *H04W 80/08* (2013.01)

(58) Field of Classification Search
USPC .................................. 370/252, 329, 386, 442
See application file for complete search history.

(56) References Cited

U.S. PATENT DOCUMENTS

| | | | |
|---|---|---|---|
| 2016/0066255 A1 | 3/2016 | Marinier et al. | |
| 2016/0309376 A1 | 10/2016 | Liu et al. | |
| 2017/0034727 A1 | 2/2017 | Li et al. | |
| 2017/0223667 A1 | 8/2017 | Yi et al. | |
| 2017/0264390 A1 | 9/2017 | Liu et al. | |
| 2017/0303220 A1 | 10/2017 | Sadeghi et al. | |
| 2019/0053089 A1* | 2/2019 | Kwak ................... | H04W 24/10 |
| 2019/0053288 A1* | 2/2019 | Zhou ................... | H04W 74/006 |
| 2020/0028640 A1* | 1/2020 | Yeo ........................ | H04L 5/005 |
| 2020/0196161 A1* | 6/2020 | Ahn ........................ | H04B 7/06 |

FOREIGN PATENT DOCUMENTS

| | | |
|---|---|---|
| CN | 104428997 A | 3/2015 |
| CN | 105874849 A | 8/2016 |
| CN | 105900474 A | 8/2016 |
| CN | 107306452 A | 10/2017 |
| CN | 107347005 A | 11/2017 |
| CN | 108347293 A | 7/2018 |
| CN | 109842472 A | 6/2019 |
| CN | 108696346 B | 7/2019 |
| EP | 3337053 | 6/2018 |
| JP | 2017512443 | 5/2017 |
| WO | WO2014071638 A1 | 5/2014 |
| WO | 2017190273 A1 | 11/2017 |
| WO | WO2017196253 A1 | 11/2017 |
| WO | WO2018028706 A1 | 2/2018 |
| WO | WO2018128504 A1 | 7/2018 |

OTHER PUBLICATIONS

3GPP TS 36.331 V14.4.0 (Sep. 2017), 3rd Generation Partnership Project; Technical Specification Group Radio Access Network; Evolved Universal Terrestrial Radio Access (E-UTRA); Radio Resource Control (RRC); Protocol specification Release 14), 753 pages.
3GPP TS 38.21 1 V1 .0.0 (Sep. 2017), 3rd Generation Partnership Project; Technical Specification Group Radio Access Network; NR; Physical channels and modulation (Release 15), 37 pages.
3GPP TS 38.213 V1 .2.0 (Jan. 1, 2017), 3rd Generation Partnership Project;Technical Specification Group Radio Access Network; NR; Physical layer procedures for control (Release 15), dated Nov. 21, 2017, 38 pages.
3GPP TS 38.214 V1 .2.0 (Nov. 2017), 3rd Generation Partnership Project; Technical Specification Group Radio Access Network; NR; Physical layer procedures for data (Release 15), dated Nov. 21, 2017, 55 pages.
Extended European Search Report issued in European Application No. 18815922.2 dated Sep. 4, 2019, 7 pages.
Office Action issued in Chinese Application No. 201810710336.5 dated Nov. 26, 2018, 8 pages.
Office Action issued in Chinese Application No. 201810710421 .1 dated Feb. 12, 2019, 16 pages.
Office Action issued in Japanese Application No. 2018-566488 dated Jan. 27, 2020, 5 pages {with English translation).
PCT International Search Report and Written Opinion issued in International Application No. PCT/CN2018/093932 dated Sep. 5, 2018, 10 pages.
R1-164773—Samsung,"On aperiodic CSI-RS design," 3GPP TSG RAN WG1 #85, Nanjing, China May 23-27, 2016, 4 pages.
R1-1700033—Huawei, HiSilicon,"Discussion and evaluation on NR-SS multiplexing and bandwidth," 3GPP TSG RAN NG1 NR Ad Hoc Meeting, Spokane, USA, Jan. 16-20, 2017, 12 pages.
R1-1700473 LG Electronics,"Discussion on CSI timing",3GPP TSG RAN WG1 NR Ad-Hoc Meeting, Spokane, USA, Jan. 16-20, 2017, 5 pages.
R1-1703353—Huawei, HiSilicon,"Discussion on SS burst set composition and SS block time index indication ," 3GPP TSG RAN WG1 Meeting #88, Athens, Greece, Feb. 13-17, 2017, 7 pages.
R1-1705052—Huawei, HiSilicon,"Discussion on SS burst set composition and SS block time index indication," 3GPP TSG RAN WG1 Meeting #88bis, Spokane, USA, Apr. 3-7, 2017, 9 pages.
R1-1707086—Xinwei, "Discussion on CSI Framework and Aperiodic CSI-RS Resources and Reports Activation," 3GPP TSG-RAN WG1 #89, Hangzhou, China, XP051272313, May 15-19, 2017, 6 pages.
R1-1708166—Huawei, HiSilicon,"Discussion on SS block time index indication," 3GPP TSG RAN WG1 Meeting #89, Hangzhou, China, May 15-19, 2017, 5 pages.
R1-1709442—Huawei et al.,"WF on Time Index Indication of SS Block," 3GPP TSG RAN WG1 Meeting RAN1 #88bis, Hangzhou, China, May 15-19, 2017, 4 pages.
R1-1709490—Samsung et al.,"WF on SS Block Index Indication," WF on SS Block Index Indication, 3GPP TSG RAN NG1 Meeting RAN1 #89, Hangzhou, PR, China, May 15-19, 2017, 4 pages.
R1-1709701—Huawei et al.,"Summary on Time Index Indication of SS Block," Summary on Time Index Indication of SS Block, 3GPP TSG RAN WG1 Meeting RAN1 #88bis, Hangzhou, China, May 15-19, 2017, 3 pages.
R1-1709913—Huawei, HiSilicon,"Time index indication," 3GPP TSG RAN WG1 NR Ad Hoc Meeting, Qingdao, China, Jun. 27-30, 2017, 3 pages.
R1-1713728—Huawei, HiSilicon,"DMRS Sequence Design for NR-PBCH and Time Index Indication," 3GPP TSG RAN NG1 Meeting #90, Prague, Czech Republic, Aug. 21-25, 2017, 5 pages.
R1-1716212—MEDIATEK Inc., "CSI framework considerations for beam management and lime requirement," 3GPP TSG RAN WG1 Meeting NR#3, Nagoya, Japan, XP051339669, Sep. 18-21, 2017, 4 pages.
R1-1718544—Qualcomm Incorporated, "Details of CSI framework," 3GPP TSG RAN WG1 Meeting #90bis, Prague, Czech, XP051341726, Oct. 9-13, 2017, 6 pages.
R1-1719441—Huawei, HiSilicon, "Remaining details of SRS design," 3GPP TSG RAN WG1 Meeting #91, Reno, USA, Nov. 27-Dec. 1, 2017, 12 pages.
R1-1719813—Huawei, HiSilicon,"On aperiodic CSI-RS triggering," 3GPP TSG RAN WG1 Meeting #91, Reno, USA, Nov. 27-Dec. 1, 2017, 5 pages.
R2-1713738—Ericsson, "RRC configuration for CSI-MeasConfig," 3GPP TSG-RAN WG2 Meeting #100 on NR, Reno, Nevada, XP051372396, Nov. 27-Dec. 1, 2017, 13 pages.
Office Action issued in Chinese Application No. 201880076017.1 dated Dec. 3, 2020, 9 pages.
3GPP TS 38.331 V0.1.0 (Oct. 2017), "3rd Generation Partnership Project; Technical Specification Group Radio Access Network; NR; Radio Resource Control (RRC); Protocol specification (Release 15)," Oct. 2017, 154 pages.
Office Action issued in Chinese Application No. 201880076017.1 dated Apr. 16, 2021, 6 pages (with English translation).

(56) References Cited

OTHER PUBLICATIONS

EPO Communication pursuant to Article 94(3) EPC issued in European Application No. 18815922.2 dated Jan. 31, 2022, 6 pages.
Qualcomm, "Summary on Beam Management Offline," 3GPP TSG RAN WG1 Meeting #90 AH, R1-1716758, Nagoya, Japan, Sep. 18-21, 2017, 21 pages.

\* cited by examiner

REFERENCE SIGNAL CONFIGURATION METHOD AND APPARATUS

CROSS-REFERENCE TO RELATED APPLICATIONS

This application is a continuation of U.S. patent application Ser. No. 16/406,876, filed on May 8, 2019, which is a continuation of International Application No. PCT/CN2018/093932, filed on Jun. 30, 2018, which claims priority to Chinese Patent Application No. 201711198251.5, filed on Nov. 25, 2017. All of the afore-mentioned patent applications are hereby incorporated by reference in their entireties.

TECHNICAL FIELD

The present disclosure relates to the communications field, and in particular, to a reference signal configuration method and apparatus.

BACKGROUND

In a New Radio (NR) communications system, a CSI-RS resource set includes one or more channel state information-reference signal (CSI-RS) resources. Each CSI-RS resource corresponds to a maximum of 32 antenna ports (AP). When a CSI-RS resource is used for beam measurement and reporting, each CSI-RS resource corresponds to two antenna ports. A timeslot offset (slot offset) is an offset between a timeslot in which a base station sends a CSI-RS trigger indication and a timeslot in which a CSI-RS is actually sent. In a current solution, a base station may send CSI-RSs aperiodically. In this case, a timeslot offset of a CSI-RS is 0 by default. In other words, the base station can send the CSI-RS only in a timeslot in which a CSI-RS trigger indication is sent (triggering in current timeslot and sending also in current timeslot).

The current CSI-RS sending manner causes low system efficiency. For example, in a scenario in which a CSI-RS is used for beam measurement and reporting, because a timeslot includes a limited quantity of orthogonal frequency division multiplexing (OFDM) symbols that can be used to send CSI-RSs which carry analog beams, when a relatively large quantity of beams need to be scanned, a plurality of CSI-RS resource sets are configured to send respective CSI-RSs in different timeslots. In this case, frequent triggering and frequent reporting are required. This configuration method wastes uplink resources, and is limited by a capability of a terminal device, resulting in low system efficiency.

SUMMARY

To resolve a technical problem, embodiments of the present invention provide a reference signal configuration method and apparatus. When a network device sends reference signals aperiodically, the network device notifies a terminal device of a timeslot offset of one or more to-be-sent reference signal resource sets by using configuration information. Therefore, the network device can flexibly send reference signals in different timeslots, thereby reducing a quantity of times of reference signal triggering and measurement result reporting, and improving efficiency of a communications system.

According to a first aspect, this application provides a reference signal configuration method, including: determining, by a network device, configuration information, sending, by the network device, the configuration information to a terminal device, and sending, by the network device on a time-frequency resource indicated by the configuration information, a reference signal indicated by one or more reference signal resource sets.

The reference signal resource set includes at least one reference signal resource, and the reference signal resource is used to indicate a reference signal configuration. For example, the reference signal resource includes one or more parameters: an antenna port number, a time-frequency resource location, a quantity of reference signals, and the like. A unit of a timeslot offset is a timeslot. In NR, a time length of a timeslot is related to a subcarrier spacing. The timeslot offset in this embodiment may be an offset between a timeslot corresponding to a reference signal resource set and a timeslot corresponding to a first reference signal resource set, or may be an offset between a timeslot corresponding to a reference signal resource set and a timeslot corresponding to a previous reference signal resource set.

In this embodiment of the present invention, the network device configures the timeslot offset of the one or more reference signal resource sets for the terminal device by sending the configuration information, so that after receiving the configuration information and a trigger indication from the network device, the terminal device can determine, based on the configuration information, a time domain location of the reference signal corresponding to the one or more reference signal resource sets, and then perform measurement based on the reference signal. According to the solution provided in this embodiment of the present invention, the network device can flexibly send reference signals, thereby reducing a quantity of times of reference signal triggering and measurement result reporting.

In a possible design, the configuration information is included in higher layer signaling, and a separate field in the higher layer signaling is used to indicate the configuration information. The higher layer signaling is signaling above a physical layer. For example, the higher layer signaling includes RRC signaling or MAC-CE signaling.

In a possible design, the configuration information is included in a "reference signal resource set configuration" field of higher layer signaling. The field may also be referred to as "reference signal resource set information" or another name. The configuration information is used to indicate a timeslot offset of one piece of reference signal resource set information.

In a possible design, the configuration information is included in a "reference signal resource setting configuration" field of higher layer signaling. The field may also be referred to as "reference signal resource setting information" or another name. The configuration information is used to indicate timeslot offsets of a plurality of reference signal resource sets.

In a possible design, a maximum value of each timeslot offset is not greater than a reporting capability value of the terminal device. For example, the reporting capability value of the terminal device includes one or more of a maximum subcarrier spacing, a maximum timeslot offset value, a maximum bitmap length, and maximum scheduled bandwidth.

In a possible design, the configuration information includes a bitmap, and each bit corresponds to one timeslot. When a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit; or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

For example, the bitmap has a length of 4, the bitmap is 0010, the bit value 1 indicates that a reference signal indicated by a reference signal resource set is sent in a corresponding timeslot, and the bit location value 0 indicates that a reference signal indicated by a reference signal resource set is not sent in a corresponding timeslot. If the network device sends a trigger indication in a timeslot n, four bit locations of the bitmap 0010 respectively correspond to the timeslot n, a timeslot n+1, a timeslot n+2, and a timeslot n+3, and based on the bit values in the bitmap, the network device sends, only in the timeslot n+2, a reference signal indicated by a reference signal resource set.

In a possible design, the configuration information includes a common timeslot offset, and the common timeslot offset is a timeslot distance or a timeslot interval between two adjacent reference signal resource sets in the plurality of reference signal resource sets. A first reference signal resource set corresponds to a timeslot in which the trigger indication is sent. The trigger indication is used to trigger the terminal device to receive the reference signal and/or report a measurement result.

In a possible design, the method further includes: sending, by the network device, the trigger indication to the terminal device, where the trigger indication is used to instruct the terminal device to receive the reference signal and/or report the measurement result. It should be understood that, the trigger indication may alternatively indicate a timeslot in which the network device sends the first reference signal resource set.

Based on the foregoing descriptions, the network device triggers, by sending one trigger indication, the terminal device to receive reference signals sent in at least two timeslots, thereby avoiding sending a trigger indication in each timeslot to trigger the terminal device to receive a reference signal, reducing a quantity of times of sending the trigger indication, and improving interaction efficiency of a communications system.

In a possible design, sending, by the network device to the terminal device in at least two timeslots, reference signals indicated by a plurality of reference signal resource sets includes:

sequentially sending, by the network device in the at least two timeslots in ascending order or descending order of index numbers of the plurality of reference signal resource sets, the reference signals indicated by the plurality of reference signal resource sets.

In a possible design, the method further includes: receiving, by the network device, a measurement result from the terminal device, where the measurement result includes a result that is obtained by the terminal device by measuring a reference signal indicated by at least one reference signal resource set.

The terminal device measures only once the reference signals sent in the at least two timeslots, and reports the measurement result to the network device, thereby avoiding measuring and reporting a reference signal in each timeslot, reducing measurement and reporting times of the terminal device, and improving interaction efficiency of a communications system.

According to a second aspect, this application provides a reference signal configuration apparatus, including:

a determining unit, configured to determine configuration information, where the configuration information is used to indicate a timeslot offset of one or more reference signal resource sets, the reference signal resource set includes at least one reference signal resource, and the reference signal resource is used to indicate a reference signal configuration; and a sending unit, configured to send the configuration information to a terminal device, where the sending unit is further configured to send, on a time-frequency resource indicated by the configuration information, a reference signal indicated by the one or more reference signal resource sets.

In a possible design, the configuration information is included in a reference signal resource set configuration of higher layer signaling.

In a possible design, the configuration information is included in a reference signal resource setting configuration.

In a possible design, the configuration information includes a bitmap bitmap, where when a value of a bit is 1, it indicates that a reference signal indicated by a reference signal resource set is sent in a timeslot corresponding to the bit, and when a value of a bit is 0, it indicates that a reference signal indicated by a reference signal resource set is not sent in a timeslot corresponding to the bit; or when a value of a hit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

In a possible design, a maximum value of a timeslot offset of each reference signal resource set needs to be not greater than a reporting capability value of the terminal device.

In a possible design, the configuration information includes a common timeslot offset, and the common timeslot offset is a timeslot distance between two adjacent reference signal resource sets in the plurality of reference signal resource sets.

In a possible design, the sending unit is further configured to send a trigger indication to the terminal device, and the trigger indication is used to instruct the terminal device to receive the reference signal and/or report a measurement result.

In a possible design, the sending unit sequentially sends, in at least two different timeslots in ascending order or descending order of index numbers of the reference signal resource sets, reference signals indicated by the reference signal resource sets.

In a possible design, the apparatus further includes:

a receiving unit, configured to receive the measurement result reported by the terminal device, where the measurement result is obtained by the terminal device by measuring the reference signal indicated by the one or more reference signal resource sets.

According to a third aspect, this application provides a reference signal configuration method, including:

receiving, by a terminal device, configuration information from a network device, where the configuration information is used to indicate a timeslot offset of one or more reference signal resource sets, the reference signal resource set includes at least one reference signal resource, and the reference signal resource is used to indicate a reference signal configuration; and receiving, by the terminal device on a time-frequency resource indicated by the configuration information, a reference signal indicated by the one or more reference signal resource sets.

The reference signal resource set includes at least one reference signal resource, the reference signal resource indicates a reference signal set, and the reference signal resource is used to indicate a reference signal configuration. For example, the configuration includes time-frequency resource information. A unit of the timeslot offset is a timeslot. In NR, a length of a timeslot is related to a subcarrier spacing. The timeslot offset in this embodiment may be an offset between a timeslot corresponding to a reference signal resource set and a timeslot corresponding to a first reference signal resource set, or may be an offset between a timeslot corresponding to a reference signal resource set and a timeslot corresponding to a previous reference signal resource set. The reference signal in this embodiment may be a CSI-RS, or may be another reference signal.

In a possible design, the configuration information is included in higher layer signaling, and a separate field is set in the higher layer signaling to indicate the configuration information. The higher layer signaling is signaling above a physical layer, for example, RRC signaling or MAC-CE signaling.

In a possible design, the configuration information is included in a reference signal resource set configuration of higher layer signaling.

In a possible design, the configuration information is included in a reference signal resource setting configuration of higher layer signaling.

In a possible design, the configuration information includes a bitmap bitmap, where when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit, or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

In a possible design, a maximum value of a timeslot offset of each reference signal resource set is not greater than a reporting capability value of the terminal device.

In a possible design, the configuration information includes a common timeslot offset, and the common timeslot offset is a timeslot distance between two adjacent reference signal resource sets in the plurality of reference signal resource sets.

In a possible design, before the receiving, by the terminal device on a time-frequency resource indicated by the configuration information, a reference signal indicated by the one or more reference signal resource sets, the method further includes:

receiving, by the terminal device, a trigger indication from the network device, where the first reference signal resource set corresponds to a timeslot in which the trigger indication is located.

In a possible design, the method further includes:

measuring, by the terminal device, the reference signal indicated by the one or more reference signal resource sets, to obtain a measurement result; and sending, by the terminal device, the measurement result to the network device.

In a possible design, index numbers of reference signal resources configured in a plurality of reference signal resource sets triggered to be transmitted at a particular time are different from each other, the index numbers of the reference signal resource are global index numbers, and an index number of any reference signal resource in corresponding reported measurement results is unique.

In a possible design, index numbers of reference signal resources configured in a plurality of reference signal resource sets triggered to be transmitted at a particular time may be all or partially the same, and a measurement result of any reference signal resource in corresponding reported measurement results includes an index number of the reference signal resource and an index number of a reference signal resource set corresponding to the reference signal resource.

According to a fourth aspect, this application provides a reference signal configuration apparatus, including:

a receiving unit, configured to receive configuration information from a network device, where the configuration information is used to indicate a timeslot offset of one or more reference signal resource sets, the reference signal resource set includes at least one reference signal resource, and the reference signal resource is used to indicate a reference signal configuration, where the receiving unit is further configured to receive, on a time-frequency resource indicated by the configuration information, a reference signal indicated by the one or more reference signal resource sets, In a possible design, the configuration information is included in a reference signal resource configuration of higher layer signaling.

In a possible design, the configuration information is included in a reference signal source setting configuration of higher layer signaling.

In a possible design, the configuration information includes a bitmap bitmap, where when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit; or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

In a possible design, a maximum value of a timeslot offset of each reference signal resource set is not greater than a reporting capability value of the configuration apparatus.

In a possible design, the configuration information includes a common timeslot offset, and the common timeslot offset is a timeslot distance between two adjacent reference signal resource sets in the plurality of reference signal resource sets.

In a possible design, the receiving unit is further configured to receive a trigger indication from the network device, and a first reference signal resource set corresponds to a timeslot in which the trigger indication is located.

In a possible design, index numbers of reference signal resources configured in a plurality of reference signal resource sets triggered to be transmitted at a particular time are different from each other, the index numbers of the reference signal resource are global index numbers, and an index number of any reference signal resource in corresponding reported measurement results is unique.

In a possible design, index numbers of reference signal resources configured in a plurality of reference signal resource sets triggered to be transmitted at a particular time may be all or partially the same, and a measurement result of any reference signal resource in corresponding reported measurement results includes an index number of the reference signal resource and an index number of a reference signal resource set corresponding to the reference signal resource.

In a possible design, the apparatus further includes:

a processing unit, configured to measure the reference signal indicated by the one or more reference signal resource sets, to obtain a measurement result; and a sending unit, configured to send the measurement result to the network device.

According to a fifth aspect, this application provides a reference signal configuration method, including:

determining, by a network device, configuration information, sending, by the network device, the configuration information to a terminal device, and sending, by the network device on a time-frequency resource indicated by the configuration information, a reference signal indicated by one or more reference signal resources.

The configuration information is used to indicate a time offset of the one or more reference signal resources. A unit of the time offset includes but is not limited to a timeslot, an OFDM symbol, or a subframe. The reference signal resource is used to indicate a reference signal configuration. For example, the configuration includes time-frequency resource information. The time offset in this embodiment of the present invention may be an offset between a time domain location corresponding to the reference signal resource and a time domain location corresponding to a first reference signal resource, or may be an offset between a time domain location corresponding to the reference signal resource and a time domain location corresponding to a previous reference signal resource. The reference signal may be a CSI-RS, or may be another reference signal.

In a possible design, the one or more reference signal resources belong to a same reference signal resource set, the one or more reference signal resources are classified into a plurality of groups, each group of reference signal resources have a same time offset value, and different groups of reference signal resources have different time offsets.

In a possible design, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

In a possible design, the one or more reference signal resources correspond to a same timeslot, and all the reference signal resources have a same time offset.

According to a sixth aspect, this application provides a reference signal configuration apparatus, including:

a determining unit, configured to determine configuration information; and a sending unit, configured to send the configuration information to a terminal device, where the sending unit is further configured to send, on a time-frequency resource indicated by the configuration information, a reference signal indicated by one or more reference signal resources.

The configuration information is used to indicate a time offset of the one or more reference signal resources. A unit of the time offset includes but is not limited to a timeslot, an OFDM symbol, or a subframe. The reference signal resource is used to indicate a reference signal configuration, and the configuration includes time-frequency resource information. The time offset in this embodiment of the present invention may be an offset between a time domain location corresponding to the reference signal resource and a time domain location corresponding to a first reference signal resource, or may be an offset between a time domain location corresponding to the reference signal resource and a time domain location corresponding to a previous reference signal resource. The reference signal may be a CSI-RS, or may be another reference signal.

In a possible design, the one or more reference signal resources belong to a same reference signal resource set, the one or more reference signal resources are classified into a plurality of groups, each group of reference signal resources have a same time offset value, and different groups of reference signal resources have different time offsets.

In a possible design, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

In a possible design, the one or more reference signal resources correspond to a same timeslot, and all the reference signal resources have a same time offset.

According to a seventh aspect, this application provides a reference signal configuration method, including:

receiving, by a terminal device, configuration information from a network device, where the configuration information is used to indicate a time offset of one or more reference signal resources, and the reference signal resource is used to indicate a reference signal configuration; and receiving, by the terminal device on a time-frequency resource indicated by the configuration information, a reference signal that is from the network device and that is indicated by the one or more reference signal resources.

In a possible design, the one or more reference signal resources belong to a same reference signal resource set, the one or more reference signal resources are classified into a plurality of groups, each group of reference signal resources have a same time offset value, and different groups of reference signal resources have different time offsets.

In a possible design, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

In a possible design, the one or more reference signal resources correspond to a same timeslot, and all the reference signal resources have a same time offset.

According to an eighth aspect, this application provides a reference signal configuration apparatus, including:

a receiving unit, configured to receive configuration information from a network device, where the configuration information is used to indicate a time offset of one or more reference signal resources, and the reference signal resource is used to indicate a reference signal configuration, where the receiving unit is further configured to receive, on a time-frequency resource indicated by the configuration information, a reference signal that is from the network device and that is indicated by the one or more reference signal resources.

In a possible design, the one or more reference signal resources belong to a same reference signal resource set, the one or more reference signal resources are classified into a plurality of groups, each group of reference signal resources have a same time offset value, and different groups of reference signal resources have different time offsets.

In a possible design, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

In a possible design, the one or more reference signal resources correspond to a same timeslot, and all the reference signal resources have a same time offset.

Another aspect of this application discloses a reference signal configuration apparatus, where the configuration apparatus includes: a receiver, a transmitter, a memory, and a processor, the memory stores a set of program code, and the processor is configured to invoke the program code stored in the memory, to perform the reference signal configuration methods in the foregoing aspects.

Based on a same inventive concept, for a problem resolving principle and beneficial effects of the apparatus, refer to the foregoing possible method implementations of the terminal device and the beneficial effects brought about. Therefore, for implementation of the apparatus, refer to the implementation of the methods, and details are not repeated herein.

Another aspect of this application provides a computer readable storage medium, where the computer readable storage medium stores an instruction, and when the computer readable storage medium runs on a computer, the computer performs the methods in the foregoing aspects.

Another aspect of this application provides a computer program product including an instruction, and when the computer program product runs on a computer, the computer performs the methods in the foregoing aspects.

BRIEF DESCRIPTION OF DRAWINGS

To describe the technical solutions in the embodiments of the present invention or the background more clearly, the following briefly describes the accompanying drawings required for describing the embodiments of the present invention or the background.

DESCRIPTION OF EMBODIMENTS

Embodiments of this application may be applied to wireless communications systems. It should be noted that, the wireless communications systems mentioned in the embodiments of this application include but are not limited to: the Narrow Band-Internet of Things (NB-IoT), the Global System for Mobile Communications (GSM), Enhanced Data rates for GSM Evolution (EDGE) system, a Wideband Code Division Multiple Access (WCDMA) system, a Code Division Multiple Address 2000 (CDMA2000) system, a Time Division-Synchronization Code Division Multiple Access (TD-SCDMA) system, a Long Term Evolution (LTE) system, an NR communications system, and three major application scenarios of a next-generation 5G mobile communications system: Enhanced Mobile Broadband (eMBB), URLLC, and Massive Machine Type Communications (mMTC).

In the embodiments of this application, a terminal device includes but is not limited to a mobile station (MS), a mobile terminal device, a mobile telephone, a handset, portable equipment, and the like. The terminal device may communicate with one or more core networks through a radio access network (RAN). For example, the terminal device may be a mobile telephone (or referred to as a "cellular" phone) or a computer having a wireless communication function, or the terminal device may be a portable, pocket-sized, handheld, computer built-in, or in-vehicle mobile apparatus or device.

Figure 1:
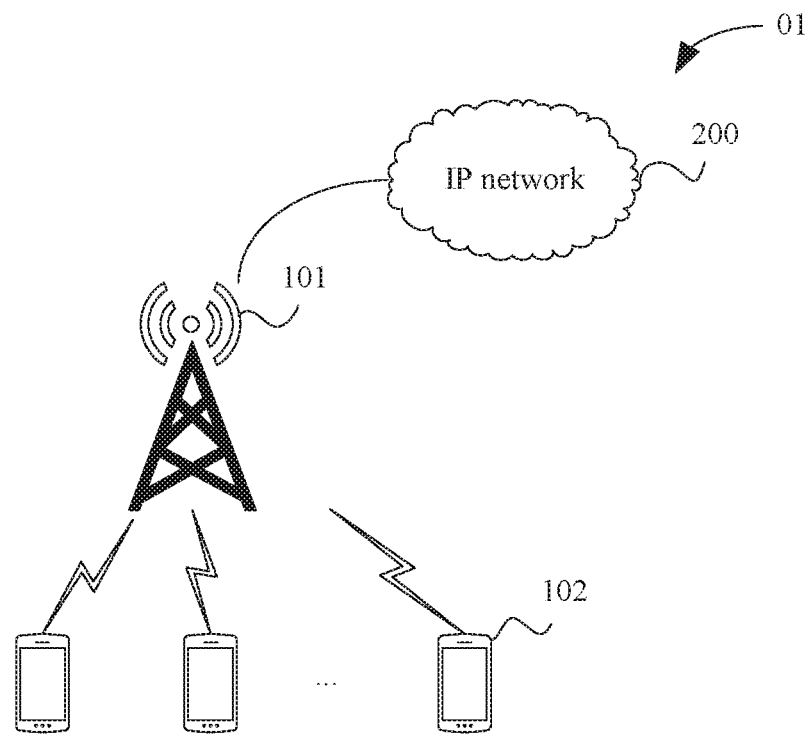
FIG. 1 is a schematic diagram of a system architecture according to an embodiment of the present invention.

FIG. 1 is a schematic architectural diagram of a communications system according to this application.

As shown in FIG. 1, a communications system 01 includes a network device 101 and a terminal device 102. When the communications system 01 includes a core network, the network device 101 may be further connected to the core network. The network device 101 may further communicate with an Internet Protocol (IP) network 200, for example, the Internet, a private IP network, or another data network. The network device provides a service for a terminal device within coverage. For example, referring to FIG. 1, the network device 101 provides wireless access for one or more terminal devices within coverage of the network device 101. In addition, network devices may further communicate with each other.

The network device 101 may be a device configured to communicate with terminal devices. For example, the network device may be a base transceiver station (BTS) in a GSM system or a CDMA system, or may be a NodeB (NB) in a WCDMA system, or may be an evolved NodeB (eNB or eNodeB) in an LTE system, or a network side device in a future 5G network. Alternatively, the network device may be a relay station, an access point, an in-vehicle device, or the like. Alternatively, in a device-to-device (D2D) communication system, the network device may be a terminal device functioning as a base station. The terminal device may include various handheld devices, in-vehicle devices, wearable devices, and computing devices having a wireless communication function or another processing device connected to a wireless modem, user equipment (UE) in various forms, a mobile station (MS), and the like.

Figure 2A:
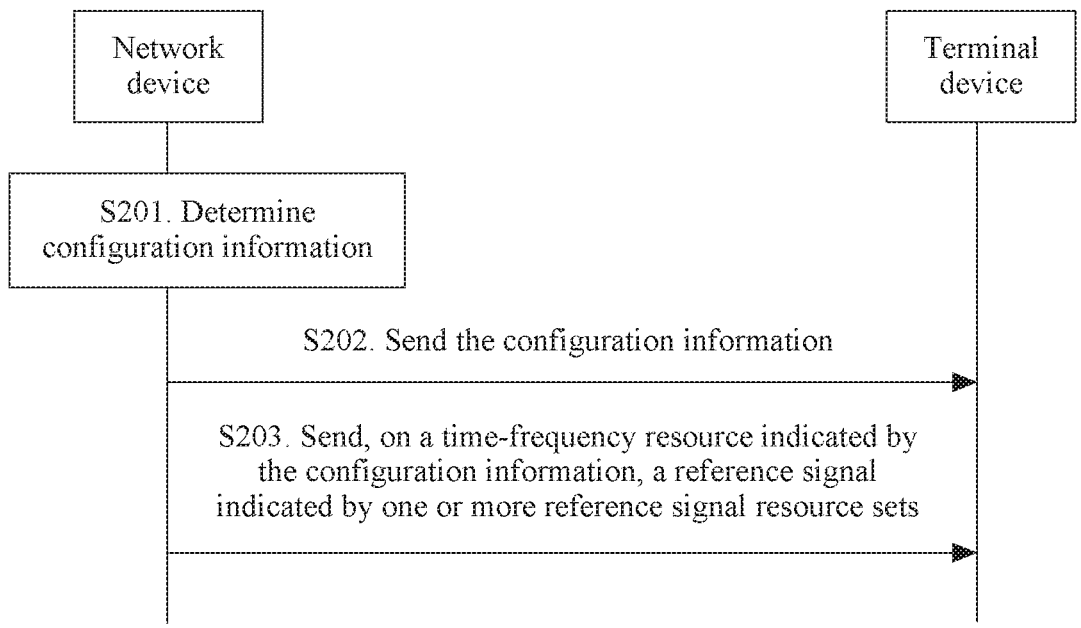
FIG. 2a is a schematic flowchart of a reference signal configuration method according to an embodiment of the present invention.

Referring to FIG. 2a, FIG. 2a shows a reference signal configuration method according to an embodiment of the present invention. The method includes but is not limited to the following steps.

S201. A network device determines configuration information.

Specifically, the configuration information is used to indicate a timeslot offset of one or more reference signal resource sets. The timeslot offset may also be referred to as a transmission timeslot offset, a transmit timeslot offset, or another name. This is not limited in the present invention. The reference signal resource set includes at least one reference signal resource, the reference signal resource is used to indicate a reference signal configuration, and the configuration includes time-frequency resource information.

A unit of the timeslot offset in this embodiment is a timeslot (slot). The timeslot offset is an offset relative to a reference timeslot. The reference timeslot may be a timeslot in which a trigger indication sent by the network device is located, or may be a timeslot in which a terminal device receives a trigger indication. In other words, a time offset is an offset between a timeslot corresponding to a reference signal resource set and the reference timeslot. The trigger indication is used to trigger the terminal device to receive a reference signal and/or report a measurement result. Optionally, the timeslot offset may alternatively be an offset between a timeslot corresponding to a reference signal resource set and a timeslot corresponding to a previous reference signal resource set. In this embodiment of the present invention, the network device sends reference signals aperiodically. The reference signal may be a CSI-RS, or may be another reference signal. This is not limited in this embodiment.

A timeslot offset of a reference signal resource has a specific value range, and a maximum value of the timeslot offset may be related to a reporting capability value of the terminal device. For the terminal device, a maximum delay from when a trigger indication is received to when a reference signal is actually received and measured may represent a terminal capability, and the terminal capability may be specifically embodied as a maximum value of a timeslot offset, a maximum value of a timeslot offset of an aperiodic CSI-RS, a maximum length of a timeslot offset bitmap, a maximum waiting delay of an aperiodic CSI-RS, a time window of an aperiodic CSI-RS, or the like. In an implementation, the maximum value of the timeslot offset is not greater than a related capability value that the terminal device reports. Optionally, the maximum value of the timeslot offset may alternatively be a value that is preconfigured by the network device or that is prestored on the terminal device. A specific value is not limited.

The configuration information is sent to the terminal device through higher layer signaling. The higher layer signaling is signaling above a physical layer. For example, the higher layer signaling includes radio resource control (RRC) signaling or media access control-control element (MAC-CE) signaling. Unless otherwise stated, RRC signaling is used as an example below.

In a possible implementation, the configuration information is included in a "reference signal resource set configuration" field of the higher layer signaling. The field may also be referred to as reference signal resource set information, or another name. The reference signal resource set configuration is used to indicate a configuration of a reference signal resource set, and the configuration includes but is not limited to an index number of a reference signal resource, resource repetition information, and the like. Optionally, in this embodiment, the configuration information is a numerical value. In this embodiment, the configuration information in each reference signal resource set is independently configured, and is used to indicate a timeslot offset of the current reference signal resource set.

Figure 2B:
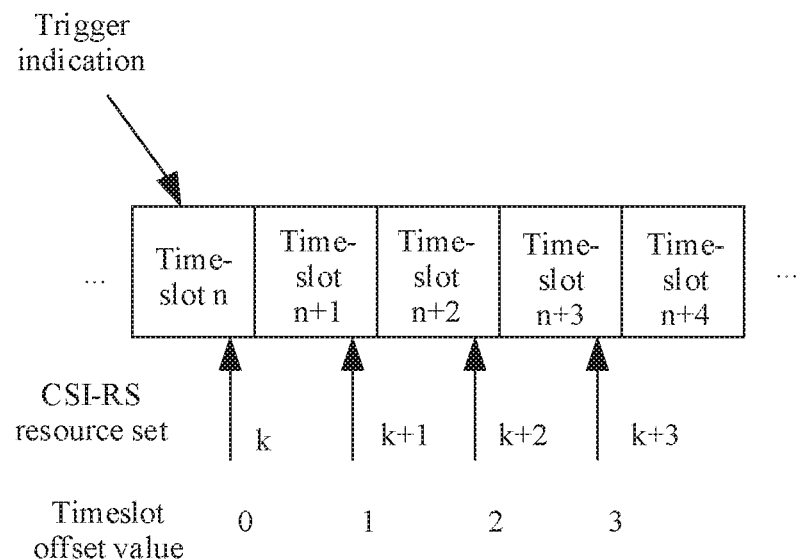
FIG. 2b is a schematic indication diagram of a timeslot offset according to an embodiment of the present invention.

For example, referring to FIG. 2b, a reference signal is a CSI-RS, and configuration information is represented by a timeslot offset. The network device configures four CSI-RS resource sets: a CSI-RS resource set k, a CSI-RS resource set k+1, a CSI-RS resource set k+2, and a CSI-RS resource set k+3. In this case, the network device configures one timeslot offset for each CSI-RS resource set. A timeslot offset of the CSI-RS resource set k is 0, a timeslot offset of the CSI-RS resource set k+1 is 1, a timeslot offset of the CSI-RS resource set k+2 is 2, and a timeslot offset of the CSI-RS resource set k+3 is 3. Assuming that the terminal device receives a CSI-RS trigger indication in timeslot n, the terminal device learns, based on configuration information received by higher layer signaling, that the CSI-RS resource set k is received in the current timeslot, the CSI-RS resource set k+1 is received in a timeslot n+1, the CSI-RS resource set k+2 is received in a timeslot n+2, and the CSI-RS resource set k+3 is received in a timeslot n+3.

In another possible implementation, the configuration information is included in a reference signal resource setting configuration field of the higher layer signaling. The field may also be referred to as reference signal resource setting information, or another name. A reference signal resource setting configuration is used to indicate configurations of a plurality of reference signal resource sets, and the configuration includes but is not limited to time-frequency resource information. In the current configuration manner, the configuration information may have the following four implementations:

Embodiment a: The configuration information includes a bitmap, each bit corresponds to one timeslot, and a first bit corresponds to a timeslot in which a trigger indication is located. When a value of a bit is 1, it indicates that a reference signal indicated by a reference signal resource set is sent in a timeslot corresponding to the bit, and when a value of a bit is 0, it indicates that a reference signal indicated by a reference signal resource set is not sent in a timeslot corresponding to the bit; or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

Specifically, the first bit in the bitmap corresponds to the timeslot in which the trigger indication is located, and the bitmap corresponds to a plurality of consecutive bits. Optionally, the configuration information further includes a bitmap length. The terminal device obtains the bitmap length based on the configuration information. A maximum length of the bitmap is not greater than a related reporting capability of the terminal.

Figure 2C:
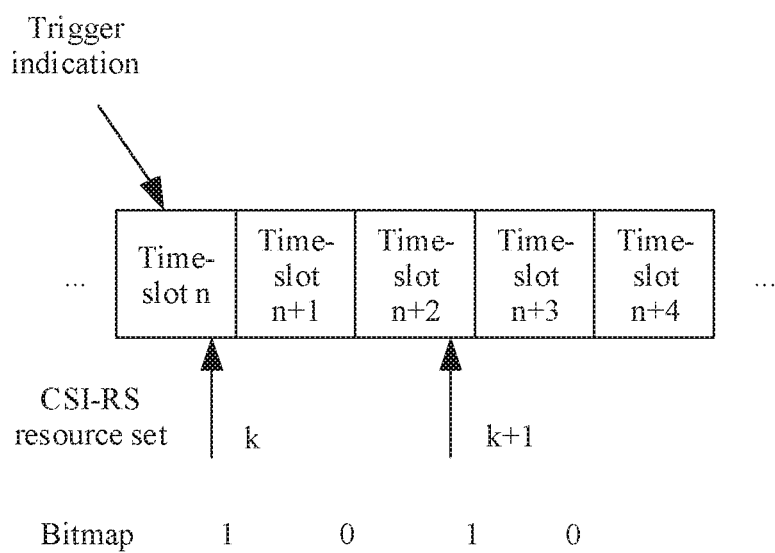
FIG. 2c is a schematic indication diagram of another timeslot offset according to an embodiment of the present invention.

For example, referring to FIG. 2c, a reference signal is a CSI-RS, a bitmap length is 4, a bitmap configured by the network device is 1010, the bit value 1 indicates that a reference signal indicated by a CSI-RS resource set is sent, and the bit value 0 indicates that a reference signal indicated by a CSI-RS resource set is not sent. A timeslot in which a trigger indication is located is a timeslot n. Four bits in the bitmap respectively correspond to the timeslot n, a timeslot n+1, a timeslot n+2, and a timeslot n+3. It can be learned, based on the bit values in the bitmap, that a CSI-RS indicated by a CSI-RS resource set k is sent in the timeslot n, a CSI-RS indicated by a CSI-RS resource set is not sent in the timeslot n+1, a CSI-RS indicated by a CSI-RS resource set k+1 is sent in the timeslot n+2, and a CSI-RS indicated by a CSI-RS resource set is not sent in the timeslot n+3.

Embodiment b: The configuration information includes a common timeslot offset, the common timeslot offset is a timeslot offset between two adjacent reference signal resource sets in the plurality of reference signal resource sets, and a timeslot of a first reference signal resource set is a timeslot in which a trigger indication is located. Optionally, the configuration information further includes a quantity of reference signal resource sets, and the terminal device learns the quantity of reference signal resource sets based on the configuration information. Alternatively, the quantity of reference signal resource sets is equal to a quantity of all configured reference signal resource sets in current reference signal resource setting, or the quantity of reference signal resource sets is equal to a quantity of all triggered reference signal resource sets in current reference signal resource setting.

Figure 2D:
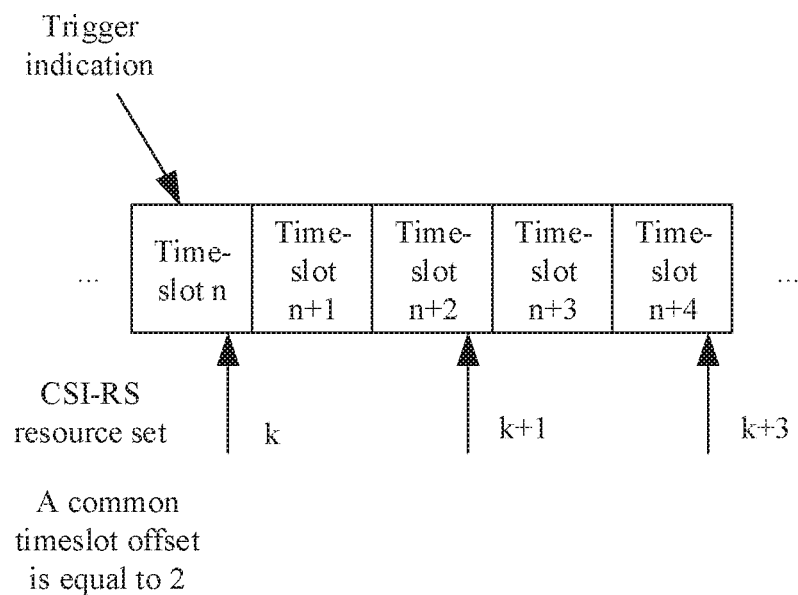
FIG. 2d is a schematic indication diagram of another timeslot offset according to an embodiment of the present invention.

For example, referring to FIG. 2d, a reference signal is a CSI-RS, a common timeslot offset is 2, a quantity of to-be-configured reference signal resource sets is 3, and a timeslot in which a trigger indication is located is timeslot n. Based on the common timeslot offset 2, a CSI-RS indicated by a CSI-RS resource set k is sent in the timeslot n, a CSI-RS indicated by a CSI-RS resource set k+1 is sent in a timeslot n+2, and a CSI-RS indicated by a CSI-RS resource set k+2 is sent in a timeslot n+4.

Embodiment c: The configuration information includes a differential timeslot offset, the differential timeslot offset is a timeslot offset between two adjacent reference signal resource sets in the plurality of reference signal resource sets, and a timeslot distance or a timeslot interval between a timeslot of a first reference signal resource set and a timeslot in which a trigger indication is located is equal to the differential timeslot offset. Optionally, the configuration information further includes a quantity of reference signal resource sets, and the terminal device learns the quantity of reference signal resource sets based on the configuration information. Alternatively, the quantity of reference signal resource sets is equal to a quantity of all configured reference signal resource sets in current reference signal resource setting, or the quantity of reference signal resource sets is equal to a quantity of all triggered reference signal resource sets in current reference signal resource setting.

Figure 2E:
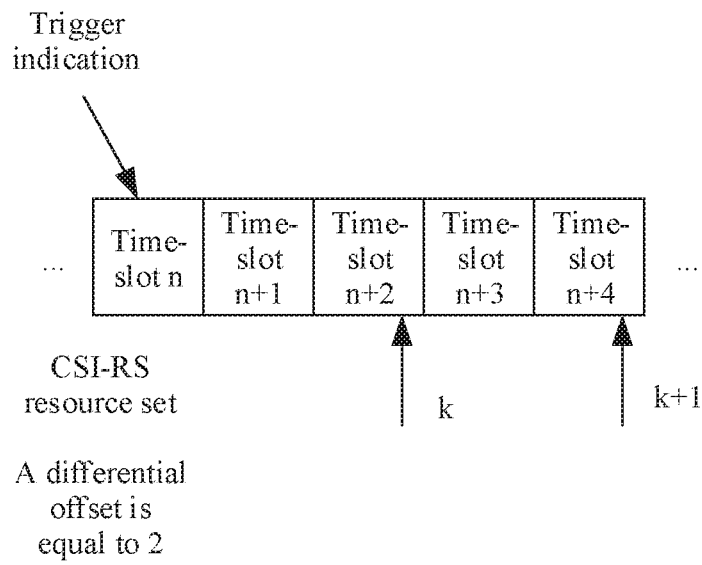
FIG. 2e is a schematic indication diagram of another timeslot offset according to an embodiment of the present invention.

For example, referring to FIG. 2e, a reference signal is a CSI-RS, a differential timeslot offset is 2, a quantity of to-be-configured reference signal resource sets is 3, and a timeslot in which a trigger indication is located is a timeslot n. Based on the differential timeslot offset 2, a CSI-RS indicated by a CSI-RS resource set k is sent in a timeslot n+2, and a CSI-RS indicated by a CSI-RS resource set k+1 is sent in a timeslot n+4.

Embodiment d: The configuration information includes logical determining information (boolean). When the logical determining information is true, the network device sends, based on a preset time offset, a reference signal indicated by the one or more reference signal resource sets; or when the logical determining information is false, the network device sends, based on a preset time offset, a reference signal indicated by the one or more reference signal resource sets.

Specifically, the time offset is a prestored or preconfigured value. The time offset in this embodiment may be an offset between a timeslot corresponding to a reference signal resource set and a reference timeslot, where the reference timeslot is a timeslot in which a trigger indication is located; or may be an offset between a timeslot corresponding to a reference signal resource set and a timeslot corresponding to a previous reference signal resource set. For a time offset indication manner, refer to the bitmap manner in Embodiment a, the common offset value manner in Embodiment b, the differential offset value manner in Embodiment c, or another manner. This is not limited in this embodiment.

In the foregoing Embodiments a to d, the configuration information is usually used to indicate timeslot locations of a plurality of reference signal resource sets. In this case, the network device and the terminal device need to agree on an actual sending sequence of the plurality of reference signal resource sets. A possible sending sequence is sequentially sending the plurality of reference signal resource sets in ascending order or descending order of index numbers of the plurality of reference signal resource sets indicated by the configuration information.

For example, the network device triggers three CSI-RS resource sets at the same time, and index numbers of the three CSI-RS resource sets are respectively 2, 5, and 8. When CSI-RSs are sent in ascending order of the index numbers of the three CSI-RS resource sets, a CSI-RS sending sequence is: a CSI-RS indicated by the CSI-RS resource set 2, a CSI-RS indicated by the CSI-RS resource set 5, and a CSI-RS indicated by the CSI-RS resource set 8. When reference signals are sent in descending order of the index numbers of the CSI-RS resource sets, a CSI-RS sending sequence is: a CSI-RS indicated by the CSI-RS resource set 8, a CSI-RS indicated by the CSI-RS resource set 5, and a CSI-RS indicated by the CSI-RS resource set 2.

In a further possible implementation, the configuration information is configured in a separate field of the higher layer signaling. The configuration information may be the bitmap in Embodiment a, the common timeslot offset in Embodiment b, the differential offset value in Embodiment c, or the logical determining information in Embodiment d. A difference lies in that, in the foregoing embodiments, a function range of the configuration information is limited only to one or more reference signal resource sets associated with one reference signal resource setting configuration, however, in this embodiment, a function range of the configuration information may cover a plurality of reference signal resource sets associated with a plurality of reference signal resource setting configurations.

In another possible implementation, after the network device sends the configuration information to the terminal device, the method further includes: The network device sends the trigger indication to the terminal device, where the trigger indication is used to trigger the terminal device to receive the reference signal and/or report a measurement result.

Specifically, a timeslot in which the trigger indication is located is a timeslot corresponding to a first reference signal resource set, and the trigger indication may be sent by using DCI (downlink control information, downlink control information) or MAC CE signaling, or sent by using other signaling. This is not limited in this embodiment. The network device may send reference signals in at least two timeslots based on the timeslot offset indicated by the configuration information. It should be noted that, a time domain location of a reference signal resource set in a timeslot may be configured by the network device and notified to the terminal device, or the network device and the terminal device prestore or preconfigure a time domain location of a reference signal resource set in a timeslot, and the network device does not need to perform notification. In this way, the network device can send, in at least two different timeslots by triggering once, the reference signals indicated by the plurality of reference signal resource sets, without a need to frequently send a trigger instruction for each reference signal resource set, thereby reducing a quantity of triggering times, improving interaction efficiency of a communications system, and reducing signaling resource consumption. In addition, when CSI-RSs are sent aperiodically, the trigger indication may further trigger measurement reporting. Therefore, frequent and unnecessary reporting is avoided while a quantity of triggering times is reduced.

In a possible implementation, the network device receives a measurement result reported by the terminal device, and the measurement result is obtained by the terminal device by measuring the reference signal indicated by the one or more reference signal resource sets.

When the reference signal is a CSI-RS, the measurement result includes at least one of a channel quality indicator (CQI), a rank indication (RI), and a precoding matrix indicator (PMI). During beam measurement and reporting, the measurement result may further include a CSI-RS resource indicator (CRI), a Layer 1-reference signal received power (L1-RSRP), and the like.

The terminal device measures the reference signal indicated by the one or more reference signal resource sets, and based on the trigger indication, reports, to the network device at a time, a measurement result that needs to be reported, thereby avoiding measurement and reporting for a reference signal in each timeslot, reducing a quantity of measurement and reporting times of the terminal device, and improving interaction efficiency of a communications system.

S202. The network device sends the configuration information to the terminal device, and the terminal device receives the configuration information sent by the network device.

The configuration information may be included in higher layer signaling, or included in a reference signal resource set configuration of higher layer signaling, or included in a reference signal resource setting configuration of higher layer signaling. For a configuration information indication method, refer to the descriptions in S201, and details are not described herein again.

S203. The network device sends, on a time-frequency resource indicated by the configuration information, a reference signal indicated by one or more reference signal resource sets, and the terminal device receives the reference signal from the network device.

Specifically, the terminal device determines the timeslot offset of the one or more reference signal resource sets based on an indication of the configuration information. For a method of indicating, in the configuration information, a time offset of the one or more reference signal resource sets, refer to the descriptions in S201, and details are not described herein again. The terminal device receives the trigger indication from the network device, and determines, based on the timeslot in which the trigger indication is located and the configuration information, a timeslot in which the reference signal corresponding to the one or more reference signal resource sets is sent. The terminal device receives the reference signal in the determined timeslot, and performs measurement based on the reference signal.

In this way, the terminal device can receive, at a time, a plurality of reference signals that are transmitted in different timeslots and that are indicated by reference signal resource sets, without a need to perform receiving once for each reference signal resource set, thereby reducing a quantity of receiving times, improving interaction efficiency of a communications system, and reducing signaling resource consumption.

In another possible implementation, the method further includes: The terminal device measures the reference signal that is sent by the network device and that is indicated by the one or more reference signal resource sets, to obtain a measurement result, and the terminal device sends the measurement result to the network device.

Specifically, in some scenarios, for example, beam measurement and reporting, when the terminal device measures a reference signal indicated by a reference signal resource set, where the reference signal resource set includes at least one reference signal resource, the terminal device may not report measurement results of all reference signal resources in the reference signal resource set, but report only measurement results of reference signals indicated by first n reference signal resources with best signal quality, where n is an integer greater than 1. The signal quality includes but is not limited to at least one of a received signal strength indicator (RSSI), a reference signal received quality (RSRQ), and a reference signal received power (RSRP).

For example, a CSI-RS resource set includes 16 CSI-RS resources: a CSI-RS resource 0 to CSI-RS resource 15. The terminal device measures CSI-RSs respectively indicated by the 16 CSI-RS resources, and the terminal device determines first four CSI-RS resources with best signal quality. Assuming that the first four CSI-RS resources with best signal quality are: a CSI-RS resource 2, a CSI-RS resource 5, a CSI-RS resource 8, and a CSI-RS resource 13, the terminal device reports measurement results of the first four CSI-RS resources with best signal quality to the network device.

In the foregoing embodiment, the terminal device measures, at a time, the reference signal indicated by the one or more reference signal resource sets, and reports the measurement result to the network device, thereby avoiding measurement and reporting for a reference signal in each timeslot, reducing a quantity of measurement and reporting times of the terminal device, and improving interaction efficiency of a communications system.

It should be noted that, when measurement results of CSI-RSs indicated by a plurality of CSI-RS resource sets are reported at a time, for example, during beam measurement result reporting, there may be the following two implementations:

Manner 1: CSI-RS resource index numbers of CSI-RS resources configured in a plurality of CSI-RS resource sets are different from each other. In this case, reported measurement results include the CSI-RS resource index numbers, and the network device may learn measurement result information uniquely corresponding to the CSI-RS resource index numbers.

For example, measurement results of three CSI-RS resource sets are to be reported, the three CSI-RS resource sets are respectively a CSI-RS resource set 1, a CSI-RS resource set 2, and a CSI-RS resource set 3, each CSI-RS resource set includes eight CSI-RSs, index numbers of CSI-RS resources in the three CSI-RS resource sets are different from each other, and the CSI-RS resources are numbered globally. It is assumed that index numbers of CSI-RS resources in the CSI-RS resource set are 0 to 7, index numbers of CSI-RS resources in the CSI-RS resource set 2 are 8 to 15, and index numbers of CSI-RS resources in the CSI-RS resource set 3 are 16 to 23. When the terminal device reports the measurement results to the network device, any reported CSI-RS resource index number is unique in current measurement reporting.

Manner 2: CSI-RS resource index numbers of CSI-RS resources configured in a plurality of CSI-RS resource sets are all or partially the same. In this case, a reported measurement result includes an index number of a CSI-RS resource and auxiliary information of a CSI-RS resource set in which the CSI-RS resource is included. The auxiliary information includes but is not limited to the index number of the CSI-RS resource set, a timeslot index number corresponding to the CSI-RS resource set, or another time identifier corresponding to the CSI-RS resource set.

For example, measurement results of three CSI-RS resource sets are to be reported, the three CSI-RS resource sets are respectively a CSI-RS resource set 1, a CSI-RS resource set 2, and a CSI-RS resource set 3, each CSI-RS resource set includes eight CSI-RSs, index numbers of CSI-RS resources in the three CSI-RS resource sets are separately numbered, and the CSI-RS resource sets include a same CSI-RS resource index number. It is assumed that index numbers of CSI-RS resources in the CSI-RS resource set are 0 to 7, index numbers of CSI-RS resources in the CSI-RS resource set 2 are 0 to 7, and index numbers of CSI-RS resources in the CSI-RS resource set 3 are 0 to 7. When the terminal device reports a measurement result to the network device, the terminal device needs to report an index number of a particular CSI-RS resource set or a time identifier corresponding to the CSI-RS resource set, and report an index number of a CSI-RS resource in the CSI-RS resource set, to ensure that the particular CSI-RS resource is unique in current measurement reporting.

Figure 3:
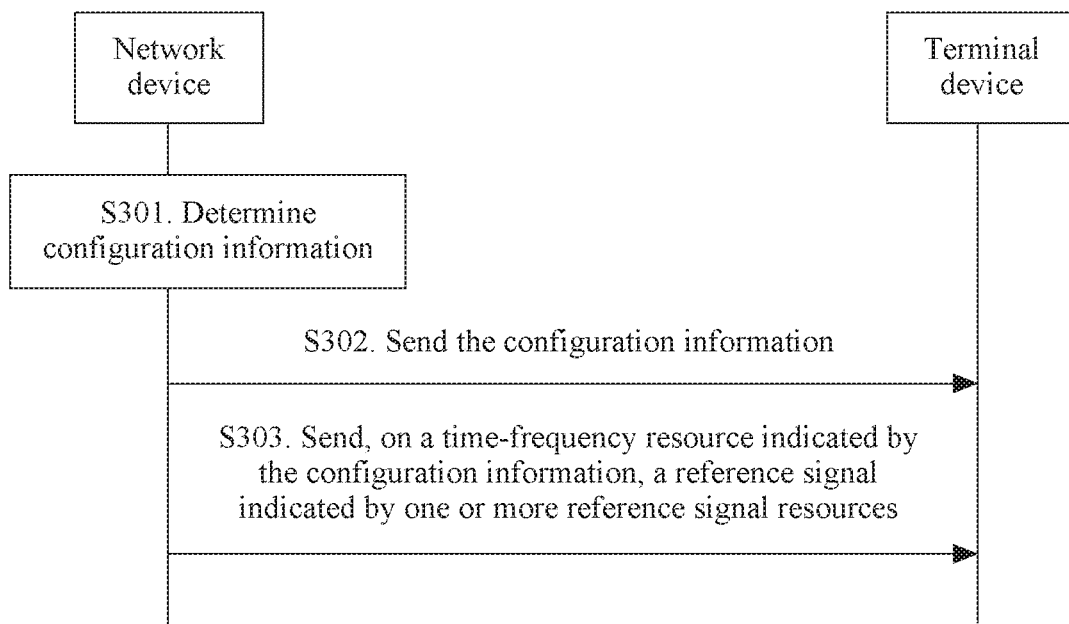
FIG. 3 is another schematic flowchart of a reference signal configuration method according to an embodiment of the present invention.

Referring to FIG. 3, FIG. 3 is another schematic flowchart of a reference signal configuration method according to an embodiment of the present invention. In this embodiment of the present invention, the method includes the following steps.

S301. A network device determines configuration information.

Specifically, the configuration information is used to indicate a time offset of one or more reference signal resources.

Optionally, the configuration information is included in a reference signal resource configuration field of higher layer signaling. The field may also be referred to as a reference signal resource information field, or another name. A reference signal resource configuration indicates a configuration of a reference signal resource. For example, the configuration includes time-frequency resource information. The time offset in this embodiment may be an offset between a time domain location corresponding to a reference signal resource and a time domain location corresponding to a first reference signal resource that is sent after triggering, or may be an offset between a time domain location corresponding to a reference signal resource and a time domain location corresponding to a previous reference signal resource. A reference signal may be a CSI-RS.

In a possible implementation, the one or more reference signal resources correspond to a same timeslot, or the one or more reference signal resources are configured in a same reference signal resource set. In this case, when belonging to a same reference signal resource set, the one or more reference signal resources have a same timeslot offset.

Specifically, a unit of the timeslot offset is a timeslot, the one or more reference signal resources correspond to a same timeslot, and the network device needs to configure timeslot offsets of the one or more reference signal resources to a same value.

In another possible implementation, the one or more reference signal resources configured in a same reference signal resource set are divided into a plurality of groups, each group of reference signal resources have a same time offset value, and different groups of reference signal resources have different time offsets.

For example, a reference signal resource set includes m+n reference signal resources in total, time offset values of first m reference signal resources are a first value, time offset values of last n reference signal resources are a second value, the first m reference signal resources correspond to a first timeslot, and the last n reference signal resources correspond to a second timeslot, where in and n are integers greater than or equal to 1.

For another example, a unit of the time offset is a timeslot, the network device is to configure 16 CSI-RS resources, the 16 CSI-RS resources belong to a same CSI-RS resource set, first eight CSI-RS resources correspond to a timeslot k, and last eight CSI-RS resources correspond to a timeslot k+1. Assuming that a timeslot in which a trigger indication is located is the timeslot k, all time offsets of the first eight CSI-RS resources are 0, and all time offsets of the last eight CSI-RS resources are 1. When the unit of the time offset is an OFDM symbol, a common symbol offset of the first eight CSI-RS resources is 0, and a common symbol offset of the last eight CSI-RS resources is 14.

S302. The network device sends the configuration information to the terminal device, and the terminal device receives the configuration information from the network device.

Optionally, the configuration information is sent to the terminal device by using the reference signal resource configuration field (the field may alternatively have another name) of the higher layer signaling.

S303. The network device sends, based on a time-frequency resource indicated by the configuration information, a reference signal indicated by one or more reference signal resources, and the terminal device receives the reference signal from the network device.

Specifically, the terminal device receives a trigger indication sent by the network device, determines a timeslot in which the trigger indication is located, and determines, based on the configuration information, a timeslot in which the one or more reference signal resources are located. The terminal device receives, in the determined timeslot, the reference signal that is from the network device and that is indicated by the one or more reference signal resources.

It should be noted that, when the network device configures a first timeslot offset for a reference signal resource set, and configures a second timeslot offset for at least one reference signal resource included in the reference signal resource set, if the first timeslot offset is different from the second timeslot offset, the network device and the terminal device determine a timeslot offset by using four methods 1. When the first timeslot offset is configured, the first timeslot offset is used. 2. When the second timeslot offset is configured, the second timeslot offset is used. 3. The first timeslot offset and the second timeslot offset are added up and used as a final timeslot offset. 4. When both the two timeslot offsets are configured, one of the timeslot offsets is selected as a final timeslot offset.

Based on the descriptions of FIG. 3, when the network device sends reference signals aperiodically, the network device notifies the terminal device of the time offset of the one or more to-be-sent reference signal resources by using the configuration information, so that the network device can flexibly send the reference signals at different time domain locations.

The reference signal configuration method in the embodiments of the present invention is described in detail above, and a reference signal configuration apparatus (briefly referred to as an apparatus 4 below) in the embodiments of the present invention is provided belo.

Figure 4:
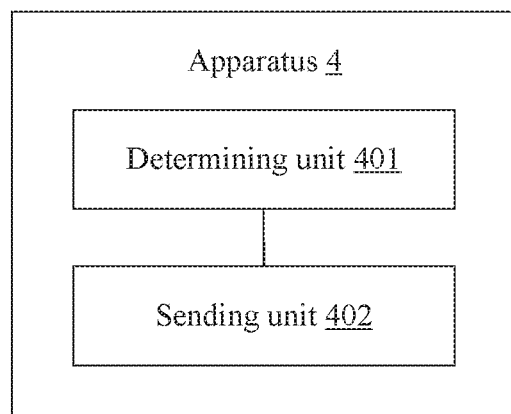
FIG. 4 is a schematic structural diagram of a reference signal configuration apparatus according to an embodiment of the present invention.

In a possible implementation, an apparatus 4 shown in FIG. 4 may implement a network device side in the embodiment shown in FIG. 2a. The apparatus 4 includes a determining unit 401 and a sending unit 402. The determining unit 401 is configured to determine configuration information. The configuration information is used to indicate a timeslot offset of one or more reference signal resource sets, the reference signal resource set includes at least one reference signal resource, and the reference signal resource is used to indicate a reference signal configuration. The sending unit 402 is configured to send the configuration information to a terminal device. The sending unit 402 is further configured to send, on a time-frequency resource indicated by the configuration information, a reference signal indicated by the one or more reference signal resource sets.

Optionally, the configuration information is included in a reference signal resource set configuration of higher layer signaling.

Optionally, the configuration information is included in a reference signal resource setting configuration.

Optionally, the configuration information includes a bitmap bitmap, where when a value of a bit is 1, it indicates that a reference signal indicated by a reference signal resource set is sent in a timeslot corresponding to the bit, and when a value of a bit is 0, it indicates that a reference signal indicated by a reference signal resource set is not sent in a timeslot corresponding to the bit; or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

Optionally, a maximum value of a timeslot offset of each reference signal resource set needs to be not greater than a reporting capability value of the terminal device.

In a possible implementation, the configuration information includes a common timeslot offset, and the common timeslot offset is a timeslot distance between two adjacent reference signal resource sets in the plurality of reference signal resource sets.

Optionally, the sending unit 402 is further configured to send a trigger indication to the terminal device, and the trigger indication is used to instruct the terminal device to receive the reference signal and/or report a measurement result.

Optionally, the sending unit 402 sequentially sends, in at least two different timeslots in ascending order or descending order of index numbers of the reference signal resource sets, reference signals indicated by the reference signal resource sets.

Optionally, the apparatus 4 further includes:

a receiving unit, configured to receive the measurement result reported by the terminal device, where the measurement result is obtained by the terminal device by measuring the reference signal indicated by the one or more reference signal resource sets.

This embodiment of the present invention and the method embodiment of FIG. 2a are based on a same idea, and bring about same technical effects. For a specific process, refer to the descriptions of the method embodiment of FIG. 2a, and details are not described herein again.

In another possible implementation, the apparatus 4 shown in FIG. 4 may implement a network device side in the embodiment shown in FIG. 3. The apparatus 4 includes a determining unit 401 and a sending unit 402. The determining unit 401 is configured to determine configuration information. The sending unit is configured to send the configuration information to a terminal device. The sending unit 402 is further configured to send, on a time-frequency resource indicated by the configuration information, a reference signal indicated by one or more reference signal resources.

The configuration information is used to indicate a time offset of the one or more reference signal resources. A unit of the time offset includes but is not limited to a timeslot, an OFDM symbol, or a subframe. The reference signal resource is used to indicate a reference signal configuration, and the configuration includes time-frequency resource information. The time offset in this embodiment of the present invention may be an offset between a time domain location corresponding to the reference signal resource and a time domain location corresponding to a first reference signal resource, or may be an offset between a time domain location corresponding to the reference signal resource and a time domain location corresponding to a previous reference signal resource. The reference signal may be a CSI-RS, or may be another reference signal.

Optionally, time offsets of first n reference signal resources are a first value, time offsets of last m reference signal resources are a second value, the first n reference signal resources correspond to a first timeslot, the last m reference signal resources correspond to a second timeslot, and the first n reference signal resources and the last m reference signal resources belong to a same reference signal resource set.

Optionally, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

Optionally, the one or more reference signal resources correspond to a same timeslot, and all the reference signal resources have a same time offset.

This embodiment of the present invention and the method embodiment of FIG. 3 are based on a same idea, and bring about same technical effects. For a specific process, refer to the descriptions of the method embodiment of FIG. 3, and details are not described herein again.

The apparatus 4 may be a network device, or the apparatus 4 may be a field-programmable gate array (FPGA), a dedicated integrated chip, a system on chip (SoC), a central processing unit (CPU), a network processor (NP), a digital signal processing circuit, or a micro controller unit (MCU) that is configured to implement a related function, or may be a programmable logic device (PLD) or another integrated chip.

The reference signal configuration method in the embodiments of the present invention is described in detail above, and a reference signal configuration apparatus (briefly referred to as an apparatus 5 below) in the embodiments of the present invention is provided below.

Figure 5:
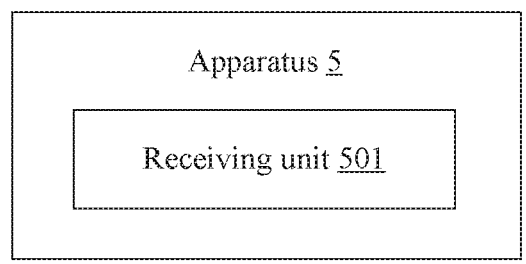
FIG. 5 is another schematic structural diagram of a reference signal configuration apparatus according to an embodiment of the present invention.

In a possible implementation, an apparatus 5 shown in FIG. 5 may implement a terminal device side in the embodiment shown in FIG. 2a. The apparatus 5 includes a receiving unit 501.

The receiving unit 501 is configured to receive configuration information from a network device. The configuration information is used to indicate a timeslot offset of one or more reference signal resource sets, the reference signal resource set includes at least one reference signal resource, and the reference signal resource is used to indicate a reference signal configuration.

The receiving unit 501 is further configured to receive, on a time-frequency resource indicated by the configuration information, a reference signal indicated by the one or more reference signal resource sets.

Optionally, the configuration information is included in a reference signal resource configuration of higher layer signaling.

Optionally, the configuration information is included in a reference signal source setting configuration of higher layer signaling.

Optionally, the configuration information includes a bitmap bitmap, where when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit; or when a value of a bit is 0, it indicates that a reference signal indicated by a reference signal resource set is sent in a timeslot corresponding to the bit, and when a value of a bit is 1, it indicates that a reference signal indicated by a reference signal resource set is not sent in a timeslot corresponding to the bit.

Optionally, a maximum value of a timeslot offset of each reference signal resource set is not greater than a reporting capability value of the configuration apparatus.

Optionally, the configuration information includes a common timeslot offset, and the common timeslot offset is a timeslot distance between two adjacent reference signal resource sets in the plurality of reference signal resource sets.

Optionally, the receiving unit 501 is further configured to receive a trigger indication from the network device, and a first reference signal resource set corresponds to a timeslot in which the trigger indication is located.

Optionally, the apparatus 5 further includes:

a processing unit, configured to measure the reference signal indicated by the one or more reference signal resource sets, to obtain a measurement result; and a sending unit, configured to send the measurement result to the network device.

This embodiment of the present invention and the method embodiment of FIG. 2a are based on a same idea, and bring about same technical effects. For a specific process, refer to the descriptions of the method embodiment of FIG. 2a, and details are not described herein again.

In another possible implementation, the apparatus 5 shown in FIG. 5 may implement a terminal device side in the embodiment shown in FIG. 3. The apparatus 5 includes a receiving unit 501.

The receiving unit 501 is configured to receive configuration information from a network device. The configuration information is used to indicate a time offset of one or more reference signal resources, and the reference signal resource is used to indicate a reference signal configuration. The receiving unit is further configured to receive, on a time-frequency resource indicated by the configuration information, a reference signal that is from the network device and that is indicated by the one or more reference signal resources.

Optionally, time offsets of first n reference signal resources are a first value, time offsets of last m reference signal resources are a second value, the first n reference signal resources correspond to a first timeslot, the last m reference signal resources correspond to a second timeslot, and the first n reference signal resources and the last m reference signal resources belong to a same reference signal resource set.

Optionally, the configuration information is included in a reference signal resource configuration of higher layer signaling. The reference signal resource configuration is used to indicate a configuration of a reference signal resource, and the configuration includes but is not limited to one or more of a quantity of reference signals, an antenna port number of a reference signal, and a time-frequency resource index.

Optionally, the one or more reference signal resources correspond to a same timeslot, and all the reference signal resources have a same time offset.

This embodiment of the present invention and the method embodiment of FIG. 3 are based on a same idea, and bring about same technical effects. For a specific process, refer to the descriptions of the method embodiment of FIG. 3, and details are not described herein again.

The apparatus 5 may be a terminal device, or the apparatus 5 may be a field-programmable gate array (FPGA), a dedicated integrated chip, a system on chip (SoC), a central processing unit (CPU), a network processor (NP), a digital signal processing circuit, or a micro controller unit (MCU) that is configured to implement a related function, or may be a programmable logic device (PLD) or another integrated chip.

The reference signal configuration method in the embodiments of the present invention is described in detail above, and a reference signal configuration apparatus (briefly referred to as an apparatus 7 below) in the embodiments of the present invention is provided below.

Figure 6:
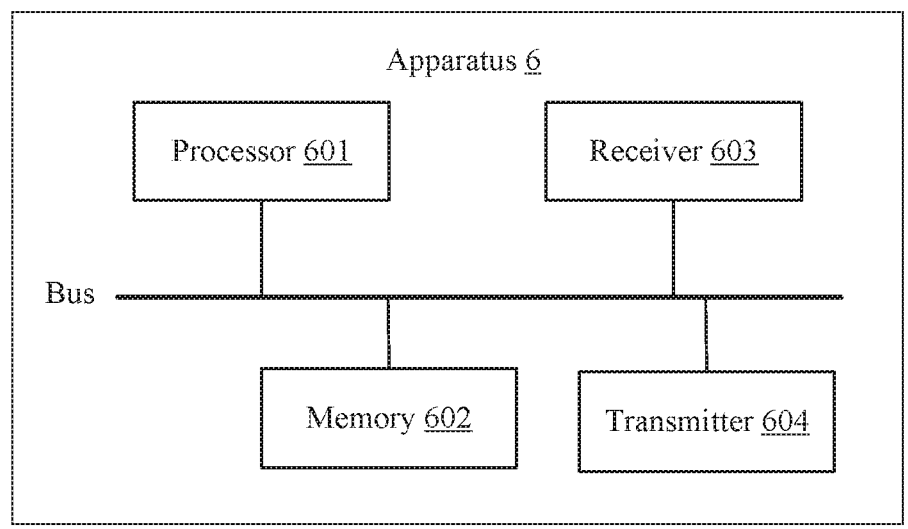
FIG. 6 is another schematic structural diagram of a reference signal configuration apparatus according to an embodiment of the present invention.

FIG. 6 is a schematic structural diagram of an apparatus according to an embodiment of the present invention, and the apparatus is briefly referred to as an apparatus 6 below. The apparatus 6 may be integrated in the foregoing network device or terminal device. As shown in FIG. 6, the apparatus includes a memory 602, a processor 601, a transmitter 604, and a receiver 603.

The memory 602 may be an independent physical unit, and may be connected to the processor 601, the transmitter 604, and the receiver 603 by using a bus. Alternatively, the memory 602, the processor 601, the transmitter 604, and the receiver 603 may be integrated together, implemented by hardware, or the like.

The transmitter 604 and the receiver 603 may be further connected to an antenna. The receiver 603 receives, by using the antenna, information sent by another device. Correspondingly, the transmitter 604 sends information to another device by using the antenna.

The memory 602 is configured to store a program for implementing the foregoing method embodiments or the modules in the apparatus embodiments. The processor 601 invokes the program, to perform operations in the foregoing method embodiments.

Optionally, when the method in the foregoing embodiments is partially or entirely implemented by software, the apparatus may include only the processor. The memory configured to store the program is located outside the apparatus, and the processor is connected to the memory by using a circuit/cable, to read and execute the program stored in the memory.

The processor may be a central processing unit (central processing unit, CPU), a network processor (network processor, NP), or a combination of a CPU and an NP.

The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory may include a volatile memory, for example, a random-access memory (RAM), and may also include a non-volatile memory, for example, a flash memory, a hard disk drive (HDD), or a solid-state drive (SSD); or the memory may include a combination of these memories.

In the foregoing embodiments, the sending unit or the transmitter performs the sending steps in the foregoing method embodiments, and the receiving unit or the receiver performs the receiving steps in the foregoing method embodiments, and other steps are performed by another unit or the processor. The sending unit and the receiving unit may form a transceiver unit, and the receiver and the transmitter may form a transceiver.

An embodiment of this application further provides a computer storage medium that stores a computer program, and the computer program is configured to perform the reference signal configuration method provided in the foregoing embodiments.

An embodiment of this application further provides a computer program product including an instruction, and when the computer program product runs on a computer, the computer performs the reference signal configuration method provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

What is claimed is:

1. A reference signal configuration method, comprising:
determining, by a network device, configuration information indicating a timeslot offset of a reference signal resource set, wherein the reference signal resource set comprises at least one reference signal resource, and the reference signal resource indicates configuration of a reference signal, the reference signal is an aperiodic channel state information-reference signal (CSI-RS), a unit of the timeslot offset is a timeslot, the timeslot offset is an offset between a timeslot corresponding to the reference signal resource set and a reference timeslot, the reference timeslot is a timeslot in which a trigger indication sent by the network device is located, and the trigger indication is used to trigger a terminal device to perform following: receiving the reference signal and reporting a measurement result, wherein the trigger indication is received prior to receiving the reference signal and reporting the measurement result; and
sending, by the network device, the configuration information to the terminal device, wherein the configuration information is included in a reference signal resource set configuration of higher layer signaling;
sending, by the network device, on a time-frequency resource indicated by the configuration information, the reference signal indicated by the reference signal resource set.

2. The method according to claim 1, wherein a maximum value of a timeslot offset of each reference signal resource set is not greater than a reporting capability value of the terminal device.

3. The method according to claim 1, wherein before the sending, by the network device, on a time-frequency resource indicated by the configuration information, the reference signal indicated by the reference signal resource set, the method further comprises:
sending, by the network device, the trigger indication to the terminal device.

4. The method according to claim 3, further comprising:
receiving, by the network device, the measurement result from the terminal device, wherein the measurement result is obtained by the terminal device by measuring the reference signal indicated by the reference signal resource set.

5. A non-transitory computer readable storage medium, wherein the computer readable storage medium stores a computer program or instruction, and when the computer program or instruction is executed on a computer, the following operations are performed:

determining, configuration information indicating a timeslot offset of a reference signal resource set, wherein the reference signal resource set comprises at least one reference signal resource, and the reference signal resource indicates configuration of a reference signal, the reference signal is an aperiodic channel state information-reference signal (CSI-RS), a unit of the timeslot offset is a timeslot, the timeslot offset is an offset between a timeslot corresponding to the reference signal resource set and a reference timeslot, the reference timeslot is a timeslot in which a trigger indication sent by a network device is located, and the trigger indication is used to trigger a terminal device to perform following: receiving the reference signal and reporting a measurement result, wherein the trigger indication is received prior to receiving the reference signal and reporting a measurement result; and sending, the configuration information to the terminal device, wherein the configuration information is included in a reference signal resource set configuration of higher layer signaling;

sending, on a time-frequency resource indicated by the configuration information, the reference signal indicated by the reference signal resource set.

6. The medium according to claim 5, wherein a maximum value of a timeslot offset of each reference signal resource set is not greater than a reporting capability value of the terminal device.

7. The medium according to claim 5, wherein before the sending, on a time-frequency resource indicated by the configuration information, the reference signal indicated by the reference signal resource set, the operations further comprise:

sending, the trigger indication to the terminal device.

8. The medium according to claim 7, wherein the operations further comprise receiving, the measurement result from the terminal device, wherein the measurement result is obtained by the terminal device by measuring the reference signal indicated by the reference signal resource set.

9. A computer program product, wherein the computer program product comprises an instruction, and when the computer program product runs on a computer, the computer performs the following operations:

determining, configuration information indicating a timeslot offset of a reference signal resource set, wherein the reference signal resource set comprises at least one reference signal resource, and the reference signal resource indicates configuration of a reference signal, the reference signal is an aperiodic channel state information-reference signal (CSI-RS), a unit of the timeslot offset is a timeslot, the timeslot offset is an offset between a timeslot corresponding to the reference signal resource set and a reference timeslot, the reference timeslot is a timeslot in which a trigger indication sent by a network device is located, and the trigger indication is used to trigger a terminal device to perform following: receiving the reference signal and reporting a measurement result, wherein the trigger indication is received prior to receiving the reference signal and reporting a measurement result; and sending, the configuration information to the terminal device, wherein the configuration information is included in a reference signal resource set configuration of higher layer signaling;

sending, on a time-frequency resource indicated by the configuration information, the reference signal indicated by the reference signal resource set.

10. The computer program product according to claim 9, wherein a maximum value of a timeslot offset of each reference signal resource set is not greater than a reporting capability value of the terminal device.

11. The computer program product according to claim 9, wherein before the sending, on a time-frequency resource indicated by the configuration information, the reference signal indicated by the reference signal resource set, the operations further comprise:

sending, the trigger indication to the terminal device.

12. The computer program product according to claim 11, wherein the operations further comprise receiving, the measurement result from the terminal device, wherein the measurement result is obtained by the terminal device by measuring the reference signal indicated by the reference signal resource set.

13. A network device, comprising:

a memory;

a processor, configured to:

determine configuration information indicating a timeslot offset of a reference signal resource set, wherein the reference signal resource set comprises at least one reference signal resource, and the reference signal resource indicates configuration of a reference signal, the reference signal is an aperiodic channel state information-reference signal (CSI-RS), a unit of the timeslot offset is a timeslot, the timeslot offset is an offset between a timeslot corresponding to the reference signal resource set and a reference timeslot, the reference timeslot is a timeslot in which a trigger indication sent by the network device is located, and the trigger indication is used to trigger a terminal device to perform following: receiving the reference signal and reporting a measurement result, wherein the trigger indication is received prior to receiving the reference signal and reporting a measurement result; and send the configuration information to the terminal device, wherein the configuration information is included in a reference signal resource set configuration of higher layer signaling;

send on a time-frequency resource indicated by the configuration information, the reference signal indicated by the reference signal resource set.

14. The network device according to claim 13, wherein a maximum value of a timeslot offset of each reference signal resource set is not greater than a reporting capability value of the terminal device.

15. The network device according to claim 13, wherein the processor is further configured to send the trigger indication to the terminal device before sending on a time-frequency resource indicated by the configuration information, the reference signal indicated by the reference signal resource set.

16. The network device according to claim 15, wherein the processor is further configured to receive the measurement result from the terminal device, wherein the measurement result is obtained by the terminal device by measuring the reference signal indicated by the reference signal resource set.

* * * * *